United States Patent [19]

Bottasso et al.

[11] 4,145,238
[45] Mar. 20, 1979

[54] PROCESS AND APPARATUS FOR TURNING-UP THE SIDEWALLS AND BODY PLIES OF FABRIC FOR TORUS-SHAPED VEHICLE TIRE

[75] Inventors: Franco Bottasso; Bruno Colombani, both of Milan, Italy

[73] Assignee: Industrie Pirelli S.p.A., Milan, Italy

[21] Appl. No.: 773,793

[22] Filed: Mar. 2, 1977

[30] Foreign Application Priority Data

Mar. 5, 1976 [IT] Italy ............................... 20885 A/76

[51] Int. Cl.² .......................................... B29H 17/12
[52] U.S. Cl. ................................... 156/132; 156/400; 156/401; 156/402
[58] Field of Search .................. 156/123 R, 124, 132, 156/133, 394 R, 398, 400–402, 408–413, 416, 421

[56] References Cited

U.S. PATENT DOCUMENTS

| 3,025,209 | 3/1962 | Trevaskis et al. | 156/400 |
| 3,265,549 | 8/1966 | Woodhall et al. | 156/132 |
| 3,434,897 | 3/1969 | Caretta et al. | 156/132 |
| 3,616,060 | 10/1971 | Askam et al. | 156/402 |
| 3,692,605 | 9/1972 | Cantarutti | 156/132 |
| 3,726,735 | 4/1973 | Harris | 156/132 |
| 3,785,905 | 1/1974 | Badenkov et al. | 156/132 |
| 3,794,542 | 2/1974 | Colombani et al. | 156/132 |
| 3,833,445 | 9/1974 | Mallory et al. | 156/132 |
| 3,929,540 | 12/1975 | Held et al. | 156/132 |

FOREIGN PATENT DOCUMENTS

| 882327 | 11/1961 | United Kingdom | 156/132 |
| 1034887 | 7/1966 | United Kingdom. | |
| 1250807 | 10/1971 | United Kingdom. | |
| 1324196 | 7/1973 | United Kingdom. | |
| 1407115 | 9/1975 | United Kingdom. | |

Primary Examiner—John E. Kittle
Attorney, Agent, or Firm—Stevens, Davis, Miller & Mosher

[57] ABSTRACT

A process is provided for turning-up sidestrips and the ends of body plies on the sidewalls of a torus-shaped tire body. The body of the tire is expanded circumferentially, the ends are turned over and the sidewall strips are stitched simultaneously.

An apparatus for practicing the process has a device provided with a support for the assembly which turns-up the sidestrips and ends of the body plies which permits insertion and removal of the assembly in the cavity of the tire.

13 Claims, 6 Drawing Figures

PROCESS AND APPARATUS FOR TURNING-UP THE SIDEWALLS AND BODY PLIES OF FABRIC FOR TORUS-SHAPED VEHICLE TIRE

This invention relates to a process and to an apparatus for practicing the process, for turning-up and assembling onto a tire body which has previously been given a torus configuration, the sidewalls and all those semi-finished products which, sometimes after having been pre-assembled together, may be disposed in the form of an annular band on the ends of the building drum.

The operational process which is generally used nowadays for building tire bodies, especially radial tire bodies, i.e., those in which all the reinforcing cords of the body plies are disposed along axial planes of the tire, is already well known.

Without dwelling on the description of the details, we can say that the process consists in building the body in two successive well distinguished states: first, a cylindrical sleeve of body plies is formed, then this sleeve is given the almost definitive shape of the finished tire and only at this point the tread band and the breaker (if there is any) are assembled on the sleeve and finally the whole assembly is rolled and the so prepared body is sent to vulcanization.

Throughout the present description we will always make reference to the building of radial tires, i.e., tires provided with a breaker, however, this must not be considered as a limitation of the invention which is applicable to any type of tire, independently.

To carry out the aforementioned process, two different methods may be followed, independently, either by means of two separate building drums (two-stage building) or by means of a single drum (one-stage building), the latter, obviously, being arranged to perform both functions of the two separate drums.

In the first case, the cylindrical sleeve of the body is prepared on a rigid collapsible cylindrical drum and then removed therefrom and transferred onto a second expansible drum on which the sleeve is given a toric shape; and thereafter, the tread band and the breaker are built on the sleeve or fitted thereon. In this latter alternative the tread band and the breaker have previously been given an annular shape.

In the case of the one-stage building, the cylindrical sleeve is constructed directly on the expansible drum. On this drum, formed substantially by three expandable bags placed side by side, there are arranged in the form of annular bands symmetrically relative to the centerline of the central bag, all the elements which form the body, beginning with the outermost ones, with respect to the finished tire, up to the innermost, i.e., the sidewalls, the chafers, the body plies.

On the tube formed by the body plies wound on the drum there are now pulled the bead cores by arranging them in an exactly pre-established position, then the drum zones corresponding to the bead cores are expanded, thereby disposing and locking the body plies against the bead cores.

The central bag is now inflated simultaneously with the mutual axial approach of the bead cores, thus obtaining the shaping of the body. At this point, also the side bags are inflated and thus expanded to turn up against the body all the semi-finished elements arranged on them outside the bead cores.

Of course, at a certain moment also the breaker ring and the tread band are assembled on the shaped body, before or after turning up the sidewalls according to whether these latter are to be disposed on the shoulder area of the tire in an external or internal position relative to the tread band.

It has to be pointed out, however, that the simple inflation of the side bags generally is not sufficient for turning-up completely the sidewalls on the shaped body since, as is well known and can easily be ascertained, the contours of the central bag and the side chambers disposed side by side, in the expanded condition, are progressively divergent from one another. It is also known that to avoid these disadvantages it was necessary to provide the building drums with suitable devices, for example, shaping bells or double series of side bags or the like, in order to cause the axially innermost side bags to abut against the shaped body at least in that part of its development which corresponds to the width of the sidewall.

The method just described, which is advantageously used in building one-ply or two ply textile cord tires, does not, however, give qualitatively satisfactory results in the case of bodies having a large number of plies or those provided with metal cord reinforcing plies.

In fact, the flexional rigidity of the fabrics of this type is such as to prevent them, when they are pressed by the expansion of the building drum between the bead core and the corresponding bead seat purposely provided on the drum, from deforming exactly according to the contour of the bead core and enveloping the latter in the flipper formed by the end of the body ply which is disposed outside the bead core and is turned up on the sidewall of the shaped body.

Indeed, these fabrics, though being locked against the bead core, dispose themselves according to a parabolic profile with the concavity facing the bead core, so that the outer edge results in being spaced from the surface of the shaped body.

Now, if, by means of a known method, the sidewalls and the other semi-finished products, which are much more flexible than aforementioned types of fabrics, are turned up on the body, the result is that considerable spacings are left between the plies, as well as a great quantity of air bubbles along the development of the bead core which cannot be removed completely even by the successive stitching operation, which is seriously prejudicial to the quality and the life of the finished tire.

An object of the present invention is to provide a building process and a device for carrying out the same, which will overcome the disadvantages described hereinabove and will produce tire bodies, specifically bodies made of rubberized high flexional rigidity cloth, having a higher quality level.

As a secondary result deriving from the above object, another object of the present invention is to provide a process for building the tire bodies in an economically more convenient way as compared to the known processes, the separate stages of turning-up and stitching the sidewalls on the shaped body being carried out in a single operation.

Thus, a first embodiment of the present invention is a process for turning-up on the side surfaces of a torus-shaped tire body, at least the sidewall strips and the ends of the body plies, disposed in an approximately parabolic configuration on each side of the body, the parabola having its axis disposed such as to coincide with that of the body, the concavity being axially turned towards the outside with respect to the body and the axially inner peripheral zone being rigidly connected to the bead of the body, wherein the turning-up is carried out by effecting simultaneously the operations of circumferential expansion, turnover and stitching of the ply ends and the sidewall strips on the sidewall of the body.

The operations may conveniently be carried out, on the parabolic surface, along substantially circular trajectories having a progressively increasing radius beginning from the radially inner zone, rigidly connected to the bead of the body, up to the radially outer edge, in two different ways, i.e., by pressing the parabolic surface against the sidewall of the body by means of a localized action turning-up device, contemporaneously displaced radially towards the outside along the sidewall of the body maintained in rotation about its own axis, or by pressing the parabolic surface against the sidewall of the body by means of a localized action turning-up device, contemporaneously displaced radially towards the outside along the sidewall of the body and maintained in rotation about the axis of the body.

According to the solutions which have now been devised, the working process normally followed comprises the stages of:

disposing at least the sidewall strips, closed in an annular fashion, on the ends of an expansible tubular cylindrical element, disposing at least one body ply, closed in annular fashion, on the central zone and, at least partly on the end zones of the expansible tubular cylindrical element, pulling onto the annular ply the reinforcing bead cores of the tire, in case provided with a filling, in such a position that the ends of the plies project sideways from the bead cores, exerting on the plies, by means of the expansion of the tubular cylindrical element at least in the zones situated at the bead cores, a radial pressure from the inside towards the outside so as to lock the plies against the bead cores, the tubular cylindrical element thus resulting in being subdivided into three sections, independent from each other and fluid tight, the section included between the bead cores forming the central zone, the side sections, situated outside the bead cores, forming the end zones, expanding the central zone and approaching the bead cores to each other, thereby obtaining the torus-shaped configuration of the tire body, expanding the end zones, thereby obtaining the substantially parabolic arrangement of the ends of the plies and the sidewall strips, wherein there are comprised the following successive stages of:

contracting the end zones, thereby obtaining an open annular space between the cylindrical surface of the tubular element and the inner parabolic surface of the end of the ply and the sidewall strip, introducing a turning-up device into the open annular space and positioning it against the inner parabolic surface in the nearest position with respect to the bead core, and carrying out the turning-up of the ends of the body plies and the sidewall strips, on the sidewall of the shaped body.

A further advantage is obtained by putting in rotation the shaped body before introducing a turning-up device into the open annular space, so as to facilitate, by centrifugal force, the preservation of the parabolic shape for the ends of the body plies and the sidewall strips, in the absence of the support action of said expanded end zones.

A second embodiment of the present invention is a device for turning-up and simultaneously stitching on the side surfaces of a tire body having a torus-shaped configuration, at least the ends of the body plies and the sidewall strips, arranged in a substantially parabolic configuration, with the axis coinciding with the axis of the body, the axially inner peripheral zone of the parabola being rigidly connected to the bead of the body, wherein there are comprised for each sidewall of the body:

at least one turning-up assembly forming a functionally inseparable operational unit comprising:

(a) means arranged to exert a stitching action of the inner parabolic surface against the sidewall of the shaped tire body, (b) means arranged to exert an expansion action, at least in the circumferential direction, of the parabolic surface, (c) means arranged to exert an action of turning-over the parabolic surface on the sidewall of the shaped body;

means for supporting the turning-up assembly which allow the introduction of the turning-up assembly into the cavity of the parabolic surface and its removal therefrom, the thrust of the turning-up assembly axially against the sidewall of the shaped body and its displacement at least radially along the sidewall of the body.

According to a preferred embodiment, the expansion and turnover means are the same and are constituted by at least one body of rotation, developed axially, freely rotating about its own axis, mounted on a support element in such a way that at least one of its generatrixes belongs to the generatrix of a surface of rotation enclosing the turning-up assembly, the expansion action and the action of turning-up the end of the ply and the sidewall strip taking place on the surface of rotation, the stitching action taking place in one or more locations of at least one plane intersecting the surface of rotation, the locations lying on the plane inside the area defined by the intersection line of the surface of rotation with the intersecting plane.

This surface of rotation may conveniently be a cylindrical or a truncated conical surface, having anyway the axis of rotation intersecting the median plane of the body. Moreover, it may advantageously be provided also with a fixed guide surface for the concave wall of the parabola, coinciding at least partly with the rotation surface, forming a connection surface between the contours of the stitching means and the body of rotation.

According to a particularly useful and efficient embodiment of the device, the stitching means is formed by a stitching disc, freely rotatable about its own axis, mounted on a support flange with the axis being orthogonal to the flange, while the expansion and turnover means are formed by the assembly of two guide elements for the wall of the parabola, developed longitudinally, freely rotating about their own axis, each of them forming one of the bodies of rotation, mounted on the flange in a facing relationship to each other and to the stitching disc, with the axes parallel to one another, lying in a plane orthogonal to the axis of the disc, disposed symmetrically at opposed sides with respect to the axis; and, finally, the support means allow the positioning of the axis of the disc in a generic position in the axial plane of the shaped body, as well as the displacement of the axis, parallel to itself and in the axial plane, both longitudinally and radially with respect to the axis of the tire body.

In particular, the guide elements are formed each by a hollow freely rotatable cylinder, cantilevered on a pin rigidly connected to the flange, while the fixed guide surface is formed by a spherical cap portion fixed on the flange between the two guide elements.

The flexibility of the device is increased by providing it with means arranged to vary the angular position of the axis of the stitching disc in the axial plane of the body which contains it around the position dictated by the flange support means, and with means arranged to allow the oscillation of the axis of the stitching disc, in the axial plane of the body which contains it, around the pre-established generic angular position.

All the characteristics just described are combined in a particularly suitable embodiment of the device, in which the support means for the flange allow the positioning of the axis of the stitching disc in the horizontal axial plane of the body and are formed by an arm on one end of which the flange is cantilevered orthogonally with the interposition of means known per se which allow the variation of the position of the flange around the orthogonal position, the other end of the arm being constrained to a vertical column, resilient means being provided which allow the rotation of the arm about the axis of the column from a position parallel to the axis of rotation of the body to another position orthogonal to the axis, the column, moreover, being displaceable radially and axially relative to the axis of the body.

For a better understanding, the present invention will now be described with reference to the accompanying drawings wherein.

Figure 1:
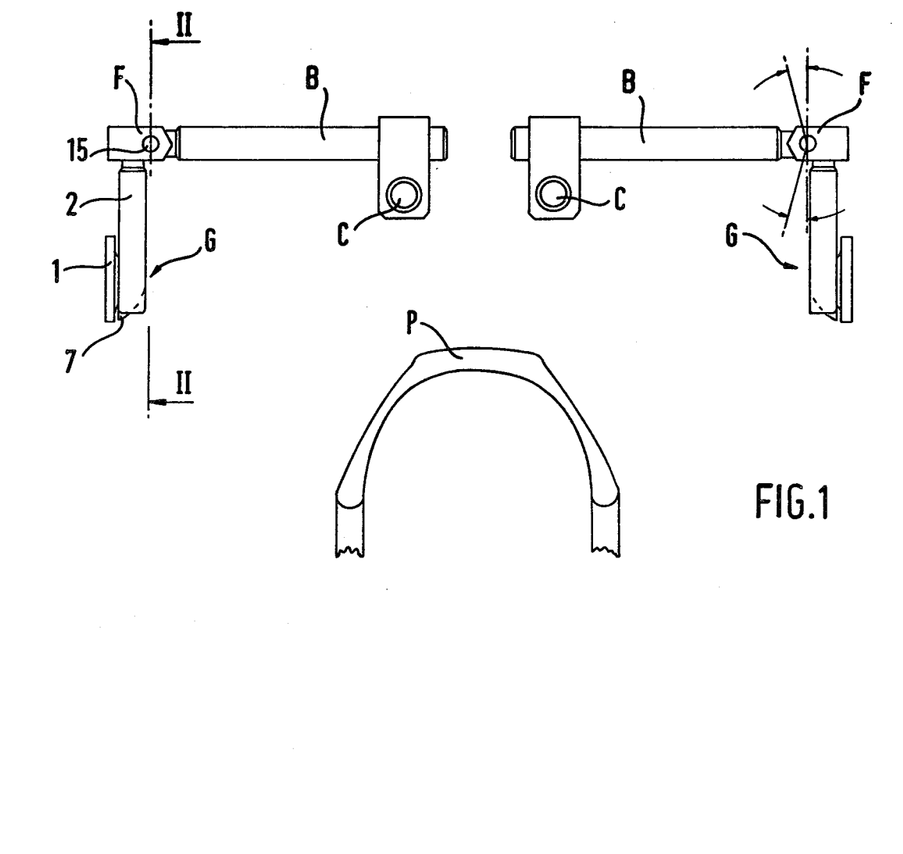
FIG. 1 is a plan view of one embodiment of the device, on the axial horizontal plane of the body.

In particular, FIG. 1 shows the device in an embodiment suitable for being mounted on the normal stitcher as, for example, the one described in Italian Pat. No. 908,012 and U.S. Pat. No. 3,794,542. This solution, however, is absolutely not limitative of the general applicability of the invention, which consists in the turning-up assembly described hereinunder, independently from whether the assembly is mounted on a stitcher instead of on another device coaxial with the body, or in any other suitable manner, as will be clearly apparent from the present description.

Referring now to FIG. 1, the device has two arms B, one end of which is fixed on the vertical column C of the stitcher (not shown) by means of a mechanism which controls the rotation of the arm about the vertical axis of the column.

As is known, such columns are mutually movable in an axial direction and concordantly displaceable in a radial direction with repect to the axis of the body.

The arc of rotation of the arm B is such as to allow the displacement of the arm at least between two positions, one parallel and one orthogonal to the axis of the body.

On the other end of each arm B, there is mounted orthogonally to the arm a turning-up assembly G formed by a flange F on which there are mounted a stitching disc 1 and two guide elements 2.

Arms B are mounted on the stitcher columns C in such a manner that the axis of rotation of the disc 1 lies in the horizontal axial plane of the body P mounted on the drum of the tire building machine.

The connection between flange F and arm B is obtained in one of the many ways known per se which are arranged to allow the adjustment of the angle between the axis of the arm and the axis of the flange, round the orthogonal position.

Flange F (FIGS. 2 and 3) is constituted by a support base 3 from which there are projecting in a cantilevered fashion two pins 4 and an elongated plate 5. Mounted orthogonally on the end of plate 5 is the stitching disc 1, while the guide elements are constituted by two rolls 2 mounted on the corresponding pins 4. The disc and the guide elements are mounted to idle on ball bearings 6.

Figure 2:
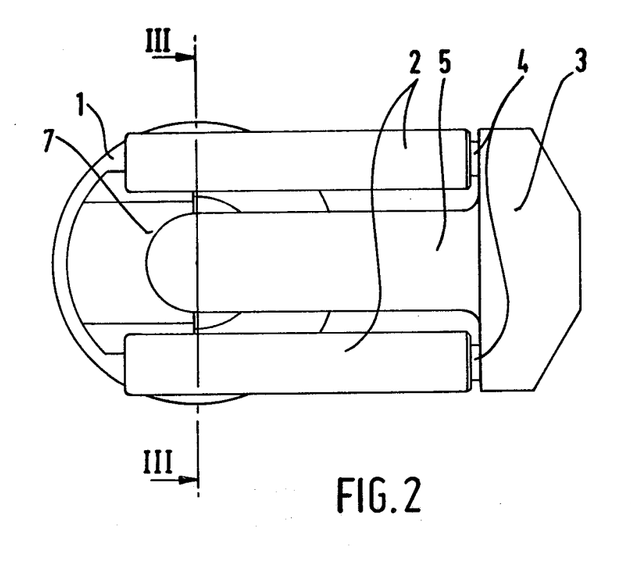
FIG. 2 is a side elevational view of the turning-up assembly, taken along the plane II—II of FIG. 1.
Figure 3:
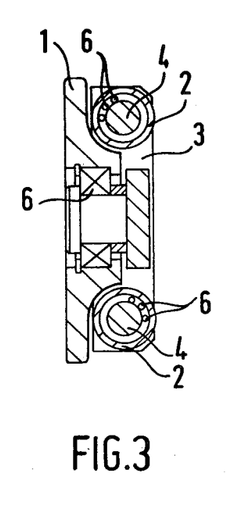
FIG. 3 is a straight sectional view of the turning-up assembly, taken along the plane III—III of FIG. 2.

For convenience, the guide elements are formed by hollow rolls, but nothing prevents the construction of the same in any other shape, for example, in a truncated cone shape or in any other manner, for instance, by means of a series of suitably shaped rings mounted to idle side by side so as to obtain the necessary guide surface developed longitudinally.

Guide elements 2 are mounted on a base 3 with the axes parallel to each other and disposed orthogonally and symmetrically relative to the axis of the rolling disc; moreover, the distance between their axes is such that each guide element has its outer surface approximately coinciding with the profile of the stitching disc.

Figure 6:
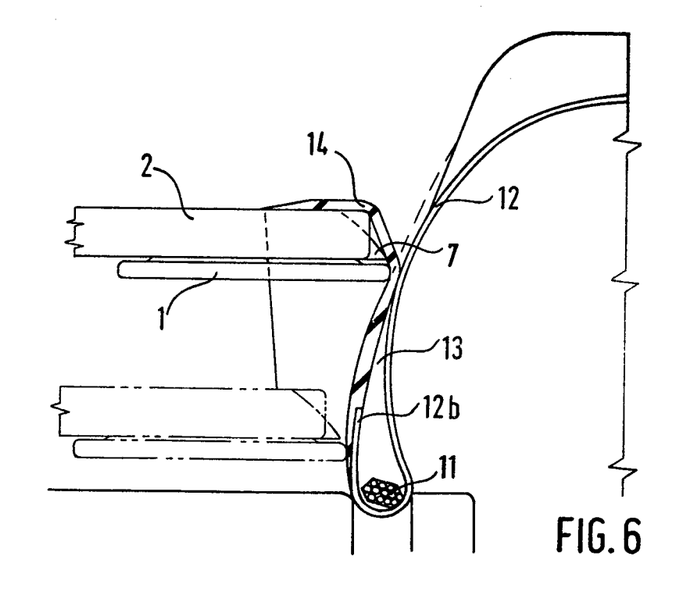
FIG. 6 shows, in the same representation as the preceding Figure, the arrangement of the sidewall strip against the body and on the turning-up assembly, about half-way through the stitching stage.

In use, in fact, the parabolic surface of the sidewall strip which is progressively turned-up on the sidewall of the body, as can be seen in FIG. 6 and as will be explained later, bears on the rotating surfaces of the two guide elements, and in such situation it must not interfere with the stitching disc which operates in a plane at 90° with respect to that of the elements; an eventual interference of this kind would, in fact, seriously deteriorate the sidewall part which has not yet been turned-up.

To further facilitate the guide of the part of the sidewall, the turning-up assembly is provided also with a shield 7, fixed to the end of the plate 5, formed by a spherical cap portion whose curvilinear surface forms a surface of connection between the profile of the stitching disc and the end sections of the profiles of the guide elements, which surface accompanies and at the same time protects the parabolic surface of the sidewall strip against tearings and curings.

After having described the device it is now possible to illustrate its operation. The operation will be described with reference to a building process as the one briefly summarized at the beginning of the present description defined as a "single-stage building process", without this being a limitation for the present invention.

In any case, more details concerning the known part of the process of the present invention can be obtained from Italian Pat. No. 733,825 and U.S. Pat. No.

3,434,897, the disclosures of which are incorporated herein by reference.

According to such process the tire body is built on an expansible cylindrical drum, on which all the elements forming the body, except the breaker and the tread band, are previously wound, closed in an annular shape and pre-assembled with each other.

Figure 4:
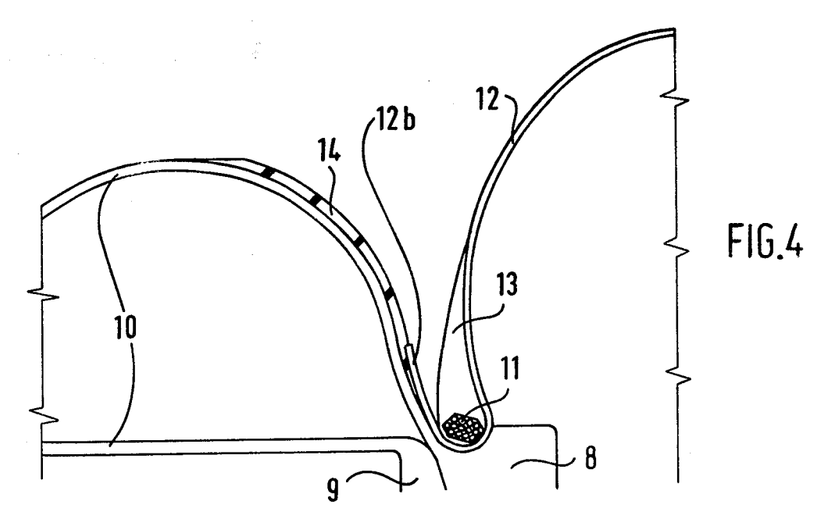
FIG. 4 shows, in a sectional view on the axial horizontal plane of the body, the stage of arranging according to a parabola the strip of the sidewall and the edge of the plies on the lefthand side of the shaped body.

The drum has three separate sections, a central one and two side sections, the separation elements between the three sections being formed by expansible rings on whose radially outer surface there is disposed a bead seat which is often formed in the beads 8 and 9 of the side bag 10 coating the side sections of the drum, as shown in FIG. 4.

After the radial expansion of the bead seats against the bead cores 11, in order to lock together the same and the body plies the central section of the drum is inflated, thereby obtaining the torus-shaped configuration of the body 12. During, or immediately after, the achievement of this configuration, usually the fillings of the bead cores are stitched against the body: to effect this operation it is very advantageous to utilize the turning-up device according to the invention, of which, obviously, only the stitching disc 1 will now be used, instead of the other usual devices already known in the art.

Before continuing it is advisable to remember again a fact which has already been mentioned and is illustrated in FIG. 4. The fabric carcasses having a high flexional rigidity such as those having a large number of plies, or those reinforced with metal cords, do not deform to envelop completely the bead core and partly its filling 13, but assume a parabolic shape with the concavity directed radially outwards. For example, the ply 12 when pressed in the bead seat against bead core 11 does not deform to envelop bead core 11 and filling 13.

Moreover, still in FIG. 4, it can be easily verified what has already been stated, i.e., that the profiles of the shaped body and of the inflated side bag are progressively diverging, so that it is not possible to turn-up the sidewall strip on the body simply by means of the inflation of the side bag.

Let us assume now that the initial moment of the process of turning-up the plies and the sidewalls is the moment at which the side bags are inflated to confer a parabolic configuration to the ring formed by the strip of the sidewall 14 and the end 12b of the ply, wound on the end of the drum.

It has already been said that because of the flexional rigidity of these fabrics the inflation of the side bag is not sufficient to obtain the turning-up of the end of the ply against the sidewall of the body. This turning-up could be obtained in a known manner, with side thrust bells which exert extremely high pressures on the side chambers, i.e., with complex and expensive machines and following a process which is more time consuming, because of actuation of the bells.

On the other hand, the result from the qualitative point of view is not satisfactory because of the impossibility of removing completely both during the turning-up and the subsequent stitching the already mentioned inclusions of air bubbles between the elements in contact with each other, with the consequent undesirable effects.

Figure 5:
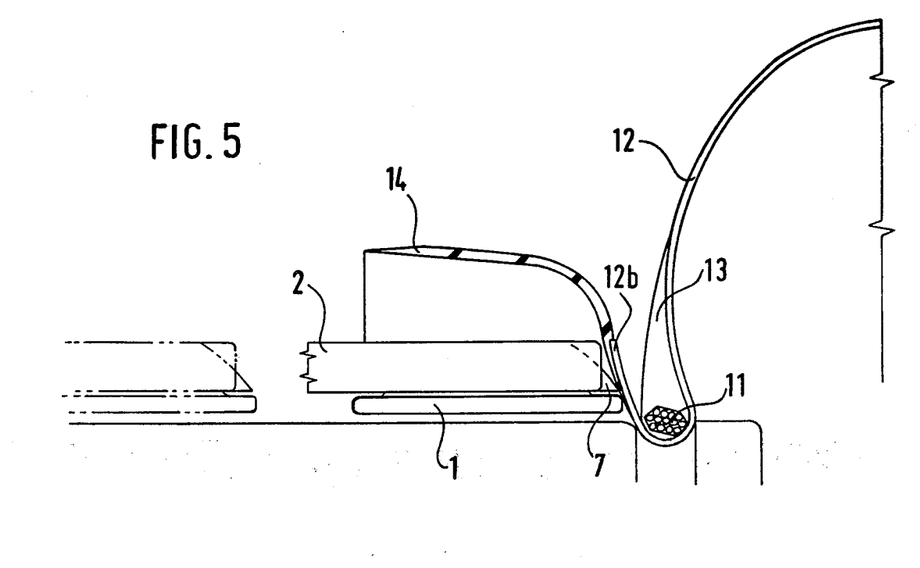
FIG. 5 shows, in the same representation as the preceding Figure, the application of turning-up assembly against the sidewall of the body and the beginning of the stitching stage.

At this moment, instead of proceeding in the usual way, the side bag is deflated. It is clear that the sidewall strip and the end of the ply, which, because of the inflation of the side bag, have assumed a parabolic shape with the horizontal axis coinciding with the axis of the body. Because they are in the plastic state, they do not assume again their original cylindrical shape but maintain the parabolic shape (FIG. 5).

The mouth of the parabola may be conveniently maintained open, with the aid of the centrifugal force, thereby causing the body to rotate about its own axis.

By means of rotation and axial displacement of the arms 2, the turning-up assembly is now transferred into the parabola, or more exactly into the open annular space formed between the outer cylindrical surface of the end of the drum and the inner parabolic surface of the assembly formed by the ply and the sidewall, arranging it in the nearest position with respect to the bead core and pressing it axially against the end 12b of the ply and, together with the latter, against the wall of the body which, moreover, is maintained in rotation about its own axis.

It is apparent that the axial pressure of the stitching disc and the rolling operation itself are now such as to obtain both the bending of the end of the ply against the filling 13 and a safe adhesion of the same and, successively, of the sidewall strip against the wall of the body, thereby also eliminating any inclusion of air between the elements in contact with each other.

By a combined axial and radial movement with respect to the body, the complete stitching operation is then carried out over the whole development of the tire body.

During this movement (FIG. 6) the parabolic surface of the sidewall strip slides bearing on the guide elements 2 and in case on the shield 7. These elements expand the surface in a circumferential direction in order to let it achieve the development of the corresponding section height of the body, so that it may be turned-up on the sidewall of the body without giving rise to folds or, on the contrary, without being submitted to local thickness discontinuities or tears and deteriorations.

It is clear now that mounting the turning-up assembly on an equipment bound to the stitcher is only one convenient technical solution; nothing would prevent mounting it, with the same orientation, on an equipment coaxial with the body, for example, together with a bead core setting device.

In this case, not only more than one turning-up assembly could be mounted on the equipment, but also the equipment itself, and with it the turning-up assemblies, could rotate relative to the body maintained stationary.

In conclusion, it is clear that in relation to different requirements different ways can be found for mounting the turning-up assembly, which, however, operates always in the way as indicated.

Normally, both the introduction of the turning-up assembly into the parabola of the sidewall strip and the subsequent process of turning-up and stitching are carried out with the turning-up assembly being disposed in such a way that the axis of the disc 1 is orthogonal to the axis of the body. It may, however, be convenient to have the possibility to vary the angular value within a certain limited range.

Various ways may then be utilized to achieve this purpose; the way utilized with the present device consists in mounting the flange to rotate about a vertical pivot 15 (FIG. 1), a pair of screws being provided which adjusts and locks the rotation at a pre-established value, comprised, for example, in an arc of 30° which has proved to be sufficient for any requirement.

It is also useful that the orientation of the turning-up assembly may oscillate around its pre-established angular position in order to overcome the moderate surface unevennesses (lappings of the plies, joints and the like) which it meets during the stitching operation, without damaging the body. Once more a person skilled in the art will have no difficulty to provide the mechanical devices suitable for his requirements; in the device according to the invention the problem has been resolved conveniently by using the pneumatic type device already used in the aforementioned stitcher and described in Italian Pat. No. 908,012 and U.S. Pat. No. 3,794,542.

In conclusion, it is clear that the present description and the accompanying drawings have only an exemplifying and non-limitative character and that persons skilled in the art will be able to provide all those convenient practical modifications which can easily be derived from the described inventive idea, without departing from the scope of the present invention.

What is claimed is:

1. In a process for making a vehicle tire wherein strips to form the sidewalls of the tire, and the plies of material which will form the body of the tire are arranged symmetrically on an expandable drum divided into a central zone and two end zones, bead cores are placed on the resulting assembly and the expandable drum is expanded in the central zone to lock the plies of material against the bead cores and shape the body and expanded in the end zones to arrange the ends of the plies and said sidewall strips in a parabolic configuration, the improvement wherein the end zones of the drum are contracted after shaping of the body into a parabolic shape to produce an annular space between the drum and the inner surface of the end of the plies forming the body and the sidewall strips, and then the ends of the plies of the material forming the body and the sidewall strips are folded from within the parabola over and against the surface of the shaped body.

2. A process for turning-up on side surfaces of a torus-shaped tire body at least sidewall strips and the ends of body plies, disposed in an approximately parabolic configuration on each side of the body, said parabola having its axis disposed to coincide with that of the body, the concavity being axially turned towards the outside with respect to the body, and the axially inner peripheral zone being rigidly connected to the bead of the body, said process comprising the steps of:

disposing at least the sidewall strips, closed in an annular fashion, on the ends of an expansible tubular cylindrical element having a central zone and an end zone on each side of the central zone, disposing at least one body ply, closed in an annular fashion on the central zone, at least partly on the end zones of said expansible tubular cylindrical element, pulling onto said annular body plies the reinforcing bead cores of the tire and any filling, in such a position that the ends of the plies project sideways from said bead cores, exerting on said plies, by means of the expansion of said tubular cylindrical element at least in the zones situated at the bead cores, a radial pressure from the inside towards the outside so as to lock the plies aganst the bead cores, said tubular cylindrical element thus being subdivided into three sections, independent from each other and fluid tight, the section included between the bead cores forming said central zone, the side section, situated outside the bead cores, forming said end zones, expanding said central zone and approaching the bead cores to each other, thereby obtaining the torus-shaped configuration of the tire body, expanding said end zones, thereby obtaining the substantially parabolic arrangement of said ends of the plies and said sidewall strips, the improvement comprising the following successive steps of:

contracting said end zones and defining an open annular space between the cylindrical surface of said tubular element and the inner parabolic surface of said end of the ply and the sidewall strip, introducing a localized action turning-up device into said open annular space and positioning it against said inner parabolic surface in the nearest position with respect to the bead core, and turning-up the ends of the body plies and the sidewall strips, by effecting simultaneously the operations of circumferential expansion, turnover and stitching of said ply ends and said sidewall strips on the sidewall of the shaped body, along substantially circular trajectories with said localized action turning-up device contemporaneously displaced radially towards the outside along said sidewall of the body maintained in rotation about its own axis, the circumferential expansion of the ply ends and the sidewall strips taking place on a surface of rotation enclosing said turning-up device, said stitching action taking place in one or more locations of at least one plane intersecting said surface of rotation, said locations lying on said plane inside the area defined by the intersection line of said surface of rotation with said intersecting plane.

3. A process as claimed in claim 2 wherein the shaped body is rotated before introducing the turning-up device into said open annular space, to thereby facilitate, by centrifugal force, the preservation of said parabolic shape for said ends of the body plies and the sidewall strips, in the absence of the support action of said expanded end zones.

4. A device for turning-up and simultaneously stitching on the side surface of a tire body having a torus-shaped configuration built on an expansible cylindrical drum with one central section and a side section on each side of the central section, at least the ends of the body plies and the sidewall strips arranged in a substantially parabolic configuration shaped by expanding and then contracting said side sections, the axially inner peripheral zone of said parabola being rigidly connected to the bead of the body, said device comprising for each sidewall of the body:
at least one turning-up assembly forming a functionally inseparable operational unit comprising:

(a) a stitching disc freely rotatable about its own axis and mounted on a support flange with the axis being orthogonal to said flange for stitching said inner parabolic surface against the sidewall of the shaped body, (b) means for expanding said parabolic surface comprising an assembly of two guide elements for the wall of said parabola, developed longitudinally, and freely rotatable about their own axis; each of the guide elements forming one body of rotation, being mounted on said flange in a facing relationship to each other and to the stitching disc, with their axis parallel to one another, lying in a plane orthogonal to the axis of said disc, and being disposed symmetrically at opposite sides with respect to the axis of the disc, (c) means for turning over said parabolic surface on the sidewall of the shaped body, and (d) means for supporting said turning-up assembly which allow the introduction of said turning-up assembly into the cavity between the parabolic surface and the cylindrical side section of the drum and its removal therefrom, the thrust of said turning-up assembly being axially against the sidewall of said shaped body, and its displacement being at least radially along the sidewall of said body, said supporting means being adapted to allow the positioning of the axis of said disc in a generic position in the axial plane of the shaped body, as well as the displacement of said axis, parallel to itself and in said axial plane, both longitudinally and radially relative to the axis of said body.

5. A device for turning-up and simultaneously stitching on the side surface of a tire body having a torus-shaped configuration on an expansible cylindrical drum with a central section and a side section on each side thereof, at least the ends of the body plies and the sidewall strips arranged in a substantially parabolic configuration by expanding and then contracting the side sections to define a space between the inner surface of the parabola and the outer surface of the side sections of the drum, the axially inner peripheral zone of the parabola being rigidly connected to the end of the body, said device comprising for each sidewall of the body:

a support flange;

a stitching disc for stitching the inner parabolic surface against the side surface of the shaped body, said stitching disc being freely rotatable about its center axis and mounted on said flange with its its central axis substantially perpendicular to the flange;

means for expanding the parabolic surface comprising two substantially parallel elongated guide elements each freely rotatable about its central longitudinal axis, said elements lying in a common plane substantially perpendicular to and being disposed symmetrically on opposite sides of the central axis of the stitching disc; and said device being movable into said space with the axis of said guide elements parallel to the axis of the body and the drum and then being movable parallel to itself both longitudinally axially inwardly and radially outwardly along the side surface of the body with the stitching disc stitching the inner parabolic surface against the side surface of the body.

6. A device as claimed in claim 3, wherein said body of rotation is a cylindrical surface whose axis of rotation intersects the median plane of the shaped body.

7. A device as claimed in claim 3, wherein said body of rotation is a truncated conical surface whose axis of rotation intersects the median plane of said body.

8. A device as claimed in claim 3, wherein said device comprises a fixed guide surface for the concave wall of said parabola, coinciding at least partly with said surface of rotation, forming a connection body between the contours of said stitching means and said body of rotation.

9. A device as claimed in claim 3, wherein said guide elements are formed each by a hollow freely rotatable cylinder, cantilevered on a pin rigidly connected to said flange.

10. A device as claimed in claim 3 further comprising a fixed guide surface formed by a spherical cap portion fixed on the flange between said two guide elements.

11. A device as claimed in claim 3, wherein means are provided for varying the angular position of the stitching disc in the axial plane of the body which contains it, around the position dictated by said flange supporting means.

12. A device as claimed in claim 3, wherein means are provided for allowing the oscillation of the axis of the stitching disc, in the axial plane of the body which contains it, around the pre-established generic angular position.

13. A device as claimed in claim 3 wherein the supporting means for said flange allow the positioning of the axis of the stitching disc in the axial horizontal plane of the body and are formed by an arm on one side of which said flange is cantilevered orthogonally, with the interposition of means for varying the position of said flange around said orthogonal position, the other end of said arm being constrained to a vertical column, resilient means being provided which allow the rotation of said arm about the axis of said column from a position parallel to the axis of rotation of the body to another position orthogonal to said axis, said column, moreover, being displaceable radially and axially relative to the axis of said body.

* * * * *

UNITED STATES PATENT AND TRADEMARK OFFICE
CERTIFICATE OF CORRECTION

PATENT NO. : 4,145,238
DATED : March 20, 1979
INVENTOR(S) : Franco Bottasso and Bruno Colombani It is certified that error appears in the above-identified patent and that said Letters Patent are hereby corrected as shown below:

IN THE CLAIMS:

In claims 6 through 13 in line one of each of these claims change "3" to --4--.

Signed and Sealed this

Fourth Day of September 1979

[SEAL]

*Attest:*

*Attesting Officer*

LUTRELLE F. PARKER
*Acting Commissioner of Patents and Trademarks*